Apr. 3, 1923.
J. W. VAUGHAN
BAND SAW GUIDE
Original Filed May 26, 1919
1,450,619
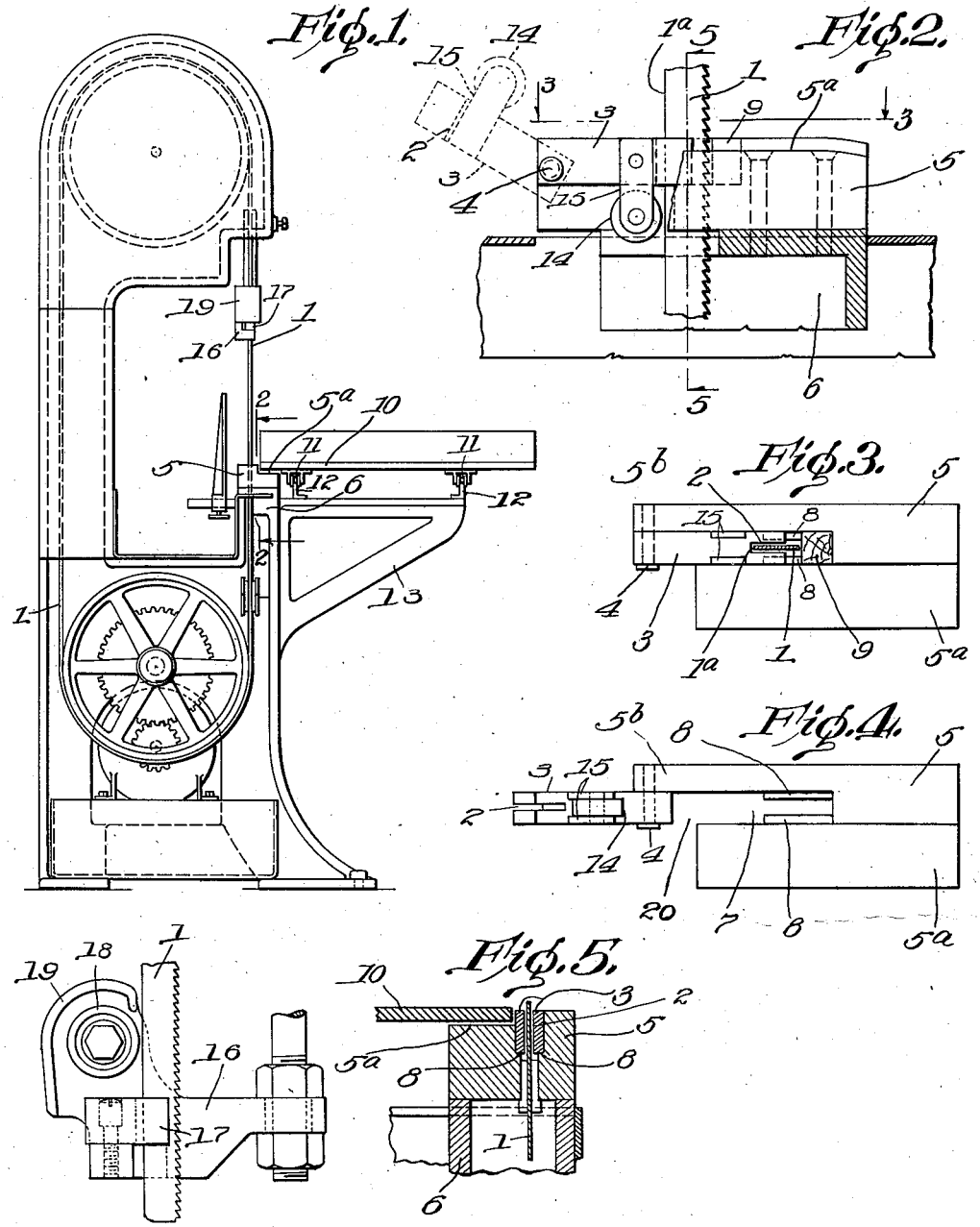

Patented Apr. 3, 1923.

1,450,619

UNITED STATES PATENT OFFICE.

JAY W. VAUGHAN, OF CHICAGO, ILLINOIS.

BAND-SAW GUIDE.

Original application filed May 26, 1919, Serial No. 299,718. Divided and this application filed September 22, 1921. Serial No. 502,501.

*To all whom it may concern:*

Be it known that I, JAY W. VAUGHAN, a citizen of the United States, and a resident of the city of Chicago, in the county of Cook and the State of Illinois, have invented certain new and useful Improvements in Band-Saw Guides, of which the following is a specification, reference being had to the accompanying drawings, forming a part thereof.

This application is a division of my application, Serial 299,718, filed May 26, 1919, directed to band sawing machines especially designed for cutting meat. The present invention relates particularly to means for guiding and steadying the saw blade in its travel. It consists of the features and elements of construction hereinafter described and shown in the drawings as indicated by the claims.

In the drawings:—

Figure 1 is a side elevation of a band saw machine embodying this invention.

Figure 2 is a detail section taken as indicated at line 2—2 on Figure 1.

Figure 3 is a detail section taken as indicated at line 3—3 on Figure 2.

Figure 4 is a detail section similar to Figure 3 but showing the saw guide swung back from its operative position to permit withdrawal of the saw blade.

Figure 5 is a detail section taken as indicated at line 5—5 on Figure 2.

Figure 6 is a detail elevation showing a roller bearing for the upper saw guide.

In a machine of this type it may be understood that the saw blade, 1, is formed as an endless steel band or belt and is run at exceedingly high speed. At the level of the work table it is guided in a slot, 2, formed in a guide block, 3, which is pivotally secured at 4 to a mounting block, 5, fixed to the frame, 6. The guide block, 3, is dimensioned to just fill the width of a space, 7, in the mounting block, 5, and in the normal position of said guide block, 3, in which its slot, 2, engages the saw blade, 1, it rests upon ledges, 8, projecting inwardly from the side walls of the space, 7. If desired a block, 9, of wood or fiber may be inserted in the inner end of the space, 7, for contact with the toothed edge of the saw blade, 1, if the latter should be temporarily deflected from its normal path, as when the cut material is withdrawn from the blade after a partial cut instead of being carried on past it in the normal direction of feed.

The work-carrying table or tray is shown at 10 mounted on rollers, 11, running upon tracks, 12, supported by any suitable form of bracket, 13, and to permit the upper surface of the table, 10, to be aligned substantially with the top of the guide block, 3, the mounting block, 5, is cut away at one side forming a depressed surface, $5^a$, over which the edge of the tray, 10, moves as indicated in Figure 5.

As adjusted for normal running the back edge, $1^a$, of the saw blade does not come into contact with the bottom of the guide slot, 2, but under pressure of its work the blade may be deflected from this path and to prevent it from engaging the bottom of said slot, 2, a roller, 14, is mounted between the arms, 15, secured rigidly to the guide block, 3. Normally the rear edge, $1^a$, of the saw blade, 1, will not even run in contact with the roller, 14, but if deflected toward it, the deflection will be limited by said roller and the blade will not reach the bottom of the slot, 2.

For a similar purpose the upper guide bracket, 16, which carries a slotted guide block, 17, for the saw blade, 1, is also provided with a roller shown at 18, which is normally out of contact with the rear edge of the saw but which is positioned so as to prevent the saw from being forced to the bottom of the guide slot in the block, 17. When used for cutting meat the saw blade is likely to accumulate and carry some small particles of the meat or some grease from the fatty tissue. To prevent this from being thrown and scattered by the roller, 18, if transferred thereto from the saw blade, a hood or guard flange, 19, is formed on the bracket, 16, as shown in Figure 6, so that such particles will be thrown against the hood and accumulate thereon in a position for convenient removal at intervals.

For mounting or removing the endless saw blade, 1, the guide block, 3, is swung about its pivot, 4, as indicated by dotted lines in Figure 2, and as shown in full lines in Figure 4. The space, 7, which is occupied by the guide block, 3, in its normal saw-guiding position opens rearwardly and a portion, $5^b$, of the mounting block, 5, carries the pivot, 4, at a point beyond the opening. The block, 3, is so dimensioned that when swung back for disengaging the guide slot, 2, from the saw blade, it leaves an opening, 20, leading from the space, 7, and through which the saw blade, 1, may be withdrawn.

I claim:—

1. In a band saw machine, a guide for the saw blade comprising a block having a vertical slot at one end to accommodate said blade and carried by a horizontal pivot at a point back of the blade, together with a mount for said block formed with a rearwardly opening space and having a part which extends rearwardly beyond the opening at one side supporting the pivot of the guide block, said block being dimensioned to lie horizontally in said space in its saw-guiding position but to stand back from the opening when swung about its pivot to permit entering or withdrawing the saw blade.

2. In the combination defined in claim 1, said block being formed to bridge and fill said space back of the saw blade when it lies in saw-guiding position therein.

3. In the combination defined in claim 1, the mount being formed with stop ledges extending from its side walls adjacent the saw blade for supporting the slotted end of the guide block.

4. In a band saw machine, a guide for the saw blade comprising a block having a vertical slot dimensioned to accommodate said blade and extending back from the normal position of the back edge of the blade, together with a roller mounted in fixed relation to said block with its periphery normally out of contact with the back of the blade but tangent to a plane extending between the back edge of the saw and the bottom of the slot and parallel to the path of said blade.

In testimony whereof, I have hereunto set my hand at Chicago, Illinois, this 7th day of September, 1921.

JAY W. VAUGHAN.